United States Patent [19]

Jeffrey

[11] Patent Number: 4,524,527
[45] Date of Patent: Jun. 25, 1985

[54] COMBINATION LEVEL SYSTEM FOR A THIN RULE

[75] Inventor: Jewell W. Jeffrey, Florence, Ala.

[73] Assignee: Lloyd James Lewis, Florence, Ala.; a part interest

[21] Appl. No.: 419,236

[22] Filed: Sep. 17, 1982

[51] Int. Cl.³ .............................................. G01B 3/06
[52] U.S. Cl. ...................................... 33/451; 33/381; 33/458; 33/342
[58] Field of Search ................. 33/451, 342, 381, 379, 33/390, 485, 458

[56] References Cited

U.S. PATENT DOCUMENTS

| | | |
|---|---|---|
| 149,532 | 4/1874 | Sherwin . |
| 948,777 | 2/1910 | Tuomi . |
| 1,338,176 | 4/1920 | Finstrom . |
| 1,848,003 | 3/1932 | Chalupny . |
| 3,145,475 | 8/1964 | Alford . |
| 3,328,887 | 7/1967 | Wright . |
| 4,194,295 | 3/1980 | Simuro et al. .......................... 33/451 |

*Primary Examiner*—William D. Martin, Jr.
*Attorney, Agent, or Firm*—T. Eugene Burts

[57] ABSTRACT

A combination of bi-directional levels is provided as an integral part of the projecting terminal section of a very thin rule. Assembly within the rule section is accomplished by means of over-sized apertures to receive centrally disposed therein fluid level cylinders with a casting of transparent hardened moldable base material encompassing the rule, and interstitially surrounding said levels such as to form a capsular structure maintaining the rule in proper spaced relation for folding, in the instance of a folding rule, with a structural reinforcement for the section of rule supporting the levels.

10 Claims, 7 Drawing Figures

COMBINATION LEVEL SYSTEM FOR A THIN RULE

ORIGIN OF THE INVENTION

The invention described herein was made by a private individual as the result of individual experimental work; and is directed toward a new and useful improvement in a combination level system for a thin rule.

BACKGROUND OF THE INVENTION

Field of the Invention

This invention relates in general to rules for measuring, and it deals more particularly with a thin rule of the portable type such as might be carried around on the job by a workman in a small pouch or in his pocket.

The invention is directed toward a level system for a small thin rule which can be inserted with the leveling device into small spaces.

With the advent of miniaturization in modern devices of all types there is a tendency to assemble structures in as compact a space as is possible under the individual circumstances. Many of these compacted structural parts must be assembled in a level position in order for the device to work properly.

One application of this type of assembly can be found in the common electrical industry or in the wiring of electrical components for building structures, where thermostats and gravity switches may be installed in a very confined area. For the switch to operate in a normal mode its housing box should be installed in a level position, since all of the other components of the switch are relatively installed at adjustable angles to the housing.

Heretofore, combination levels in connection with measuring devices have neglected the demands of miniaturization. The devices which have been provided might have been attached to or a part of a thin rule or measuring device, but the leveling devices themselves were not intended to be inserted into confined spaces.

After competent search, no existing devices of the type disclosed in the present invention were found, there being six references which were considered, but which do not appear to conflict with the present invention or anticipate either the apparatus or the objects and purposes for which it was designed.

The prior art discloses the following U.S. Pat. Nos.:
G. L. Finstrom, 1,338,176
J. C. Alford, 3,145,475
D. E. Wright, 3,328,887
U. Tuomi, 948,777
W. Chalupny, 1,848,003
J. T. Sherwin, 149,532

The Finstrom, U.S. Pat. No. 1,338,176 shows a collapsible extensible rule having a combination of bubble levels to be read both in the vertical and horizontal position. However, it will be noted from this patent, which was issued in 1920, that the sections 17, 18, 19, 20, 21, 22, 23, 24, 25 and 26 are stacked within the case 30 and are extensible and interlocking in order to form a long length of rule which may be used for the purpose of measuring. The bubble level system in this instance is not an integrated system and they are contained in the case 30 which houses the extensible rule. There would be no manner in which this patent could teach the thrusting of the end of a thin rule containing a level system into a confined space. The entire handle housing in this patent would have to be employed in order to utilize the level.

The Alford, U.S. Pat. No. 3,145,475 shows a measuring and marking device. This does not relate to a thin extendable or a collapsible rule at all, but shows a handle which is attached to the measuring and marking device, which handle contains both a horizontal and a vertical level bubble adjacent to the rule. There would be no way in which this patent could teach a system which could be adapted to a thin rule and placed within a confined space.

The Wright, U.S. Pat. No. 3,328,887 shows a layout tool which could be considered in the same capacity as the extensible rule of the first patent mentioned above. However, this tool discloses two watch face type levels, one which is for a vertical reading and the other for a horizontal reading, contained one above the other, along the line of the rule and recessed into the face of a relatively thick rule which obviously could not be placed in a confined space for the taking of measurements or reading a level. Neither are these units integrated into a single unitary formable unit.

The Tuomi U.S. Pat. No. 948,777 shows a combined carpenter's tool which could not be designated as a thin rule. There is no combined form unit or structure containing both levels and they appear to be in a rather thick section of the rule disposed in the center of the thickness of the rule. Although it is not merely a matter of degree in the disclosure of this patent, it is one which is directed to a device used for laying out door and window casements which are considerably larger than the confined spaces to which the present invention is adapted.

The Chalupny U.S. Pat. No. 1,848,003 shows a rule wherein the levels are adjacently located. One of these could be read from either direction. However, there is not an integral unitary formation with a collapsible or a thin rule which might be inserted into a confined space. This patent has the levels located in such position that it is obvious that it would not suggest the insertion of the levels themself into any confined space.

The Sherwin U.S. Pat. No. 149,532, shows an extensible sliding rule with the formation of the levels in the rule. Again, this patent is not directed to a thin rule, but rather to the technical aspects of a tongue and groove device whereby the rule may be extended upon itself and which would not lend itself to the type of assembly of system of levels which we have in the present invention. It will be noted that the levels are located in the thick part of the rule and do not suggest the insertion of the levels themself into any confined space or teach any of the characteristics of the objects and features of the invention.

Hence, it can be easily seen that none of the prior art teaches any system which would be obvious to one skilled in the art such as to suggest the system employed in the thin rule in the present invention.

SUMMARY AND OBJECTS OF THE INVENTION

This invention relates to measuring and leveling devices, and it deals more particularly with a combination of levels adapted to be an integral part of the measuring end of a very thin rule.

An important object of the invention is to provide a level integral with a thin extensible rule which can be used to reach into crowded and confined spaces for leveling purposes.

An important feature in connection therewith resides in the provision of a system of levels located in the projecting end of a thin rule which can be inserted into small places and still be readable.

A further object of the invention is to provide a means of mounting the levels within the body of a thin folding rule such that the same can still be folded in the normal manner and the levels be sufficiently large enough to be read.

A salient feature of the invention in this connection resides in the provision of a mounting means wherein the levels are mounted in the rule body encapsulated in an encompassing casting of transparent hardened moldable base material such that the casting allows normal folding of the rule and lends to the underlying rule and level structure a firm support.

A final object is to provide in such a level system for a thin rule one which is simple in design and economical to produce.

The features of novelty in the present structure are designed to meet these ends.

DETAILED DESCRIPTION OF THE INVENTION

Figure 1:
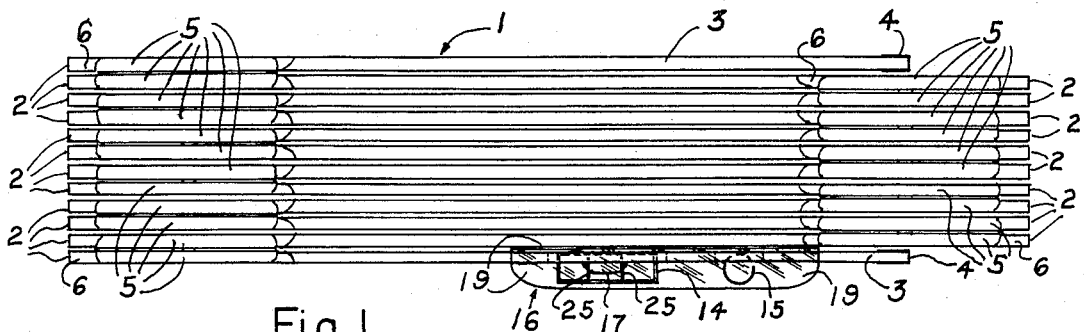
FIG 1 is a top view of an embodiment of the invention in a very thin folding rule having its terminal section modified to show the top of the level mounting portion of the rule and the surrounding transparent casting.

Referring more particularly to the drawings, FIG. 1 discloses an embodiment of a thin rule to which this invention may be applied. In this case, it is a thin folding rule generally designated by 1. The rule has a plurality of inner leaf sections 2 and a pair of outer terminal end leaf sections 3. Each terminal end leaf section is provided with a metal guard 4 to protect the end of the rule.

The distal ends of each leaf section 2 and 3 are provided with indentations 6 over which are clamped pivot plates 5 through which extend spring-loaded pivot pins 7 retained by collars 8.

Figure 7:
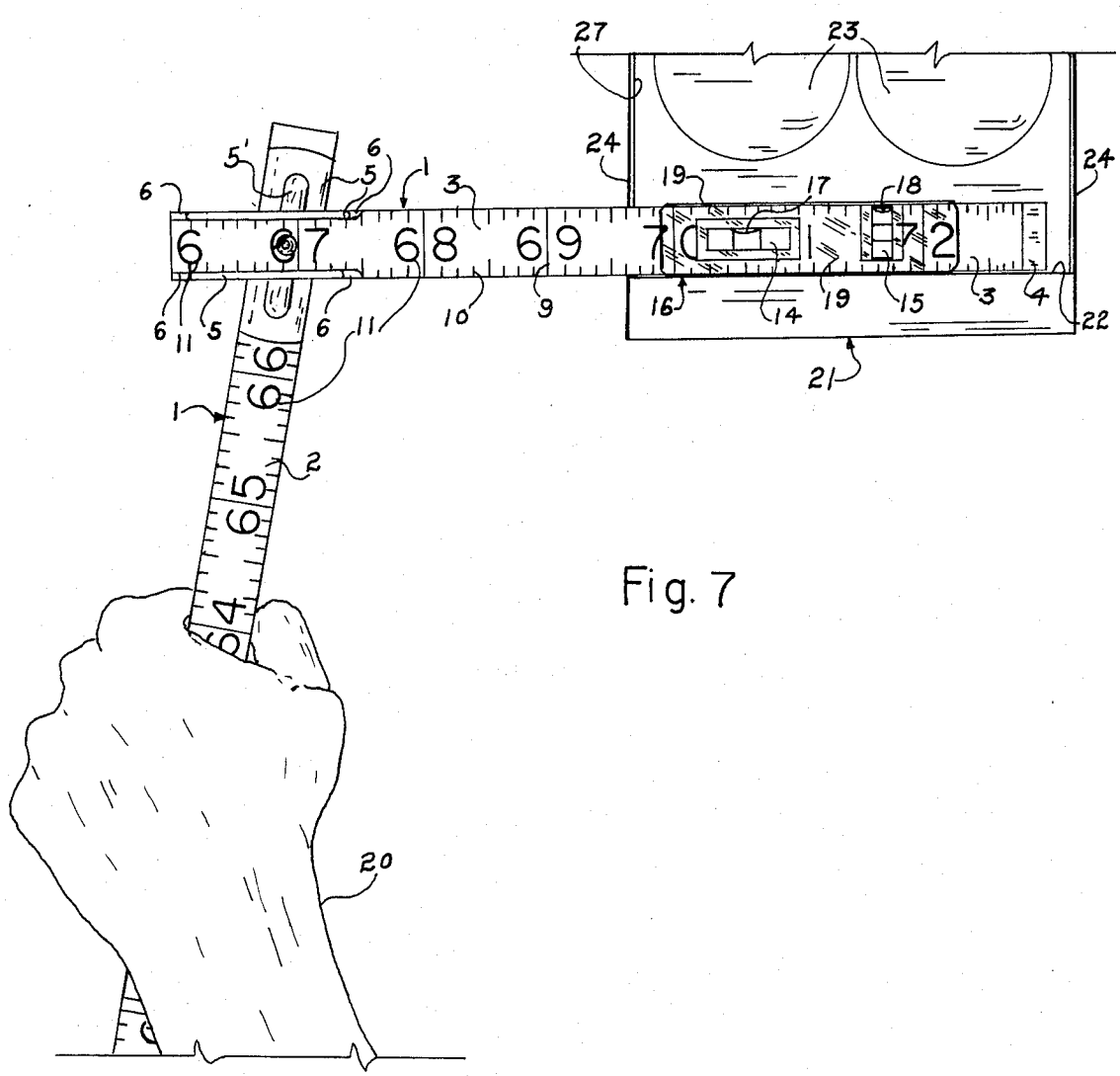
FIG. 7 is a pictorial plan view of a ruler of the type illustrated in FIGS. 1, 2, 4 and 6, with a merely illustrative system of numbering, showing how the level of said rule can be inserted into a crowded space in a partially shown diagramatic illustration of an electrical switch box.

Referring to FIG. 7, it can be seen that each pivot plate 5 is provided with a raised rib 5' which springs into a corresponding recess in the opposite pivot plate 5.

Figure 2:
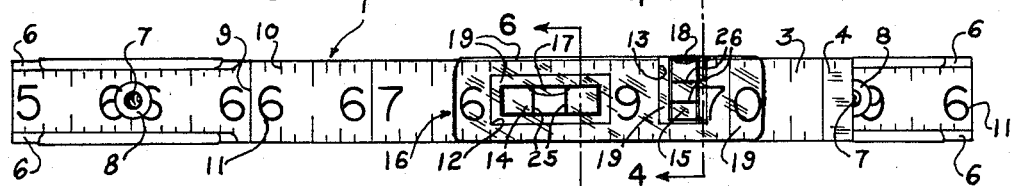
FIG. 2 is an elevation view of the terminal section of the rule showing the mounted horizontal and vertical level cylinders in the preferred embodiment surrounded by the transparent casting

As can be seen from FIG. 2, the rule is calibrated with inch markings 9 and subdivision markings 10 throughout its length. Appropriate numerals 11 are spaced along at regular intervals, depending upon the size and length of the rule. These markings do not bear upon and the numerals 11 do not limit the invention, as can be seen from FIG. 7, where it is indicated that any different numbering system can be used.

Referring more particularly to FIG. 2, it can be seen that in this embodiment of the invention there is provided, extending axially along the length of the rule, a rectangular horizontal aperture 12 and a notched-in vertical aperture 13, both of which are considerably larger than the respective horizontal level cylinder 14 and vertical level cylinder 15 (or 15' in FIG. 3) intended to occupy this opening.

A very important element of the invention is a casting of transparent hardened moldable base material, generally designated by the numeral 16, which is molded onto the leaf section 3 to position and encompass the horizontal level cylinder 14 and vertical level cylinder 15 (15' in FIG. 3) in such manner that each of the level cylinders is centered in the respective receiving aperture, with it being noted that the vertical level cylinder is slightly raised from the bottom of its aperture in order that the moldable base material may flow thereunder.

With reference to FIGS. 1, 2, 3, 4, 5 and 6, the structure of the encapsulating casting 16 is very important. Referring to these drawings, with particular attention to the sectional views, FIGS. 4, 5 and 6, it can be seen that the transparent molded material 19 has flowed freely through the interstitial spaces in the apertures 12 and 13, respectively, such that this material flows over around and under the level 14 as well as the levels 15 and 15'. The material 19 also is built up in a thin layer over the top of the rule leaf section 3 and the level 15 and on the back or inside of the rule to a thickness equal to the normal space between the leaves. This is important to retain the structural integrity of the rule with the cutout apertures.

Figure 3:
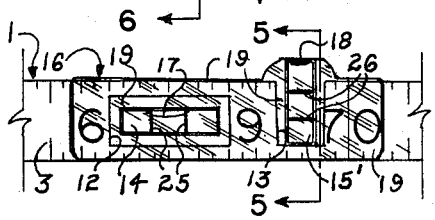
FIG. 3 is a partial elevation view of the rule in FIG. 2, showing a modification of the vertical level assembly to accomodate an enlarged vertical cylinder.

In the modification shown in FIG. 3, the transparent material 19 has been so molded as to build the casting 16 up a sufficiently higher distance from the top of the leaf section 3 in order to make it possible to use a longer level cylinder 15'. This structure also would make it possible to use a slightly larger level cylinder 15' such that its bubble 18 would be visible from the top when the leaf rule and level cylinder are maintained in the vertical position as indicated in FIG. 3. Bubble mark lines 25 and 26 are provided on the horizontal and vertical positioned levels respectively.

It can be seen that the bubble mark lines 25 on the horizontal cylinder 14 would mark the horizontal level from the top, as indicated in FIG. 1, while a placing of the rule on its side with the thin inner side of the casting 16 on a flat surface would make the bubble capable of being read in the horizontal level 14 from the side. This would also bring into play the reading of the bubble in the levels 15 and 15' for a different direction of leveling.

Nevertheless, with the extension and a larger level cylinder 15' in the structure indicated in FIG. 3, it would be possible to place a center level bubble mark in the top of level 15' and get an omni-directional view of leveling. This is not a preferred embodiment of the invention, but is mentioned to show the possibilities in use of this invention with a minor modification. It is important that in casting a thin film of transparent molded material 19 be maintained on the inner surface of the end leaf section 3. This allows the invention to work quite well with a folding extension rule as in FIG. 1, such that the rule will fold in the normal manner and fit into a pocket or a case when not being used by the worker.

It is anticipated that the level cylinders 14 and 15 will undoubtedly be of different sizes in most embodiments of the invention. This is anticipated for the reason that a bubble will be more easily read in a thin cylinder 15 when the rule is lying on its side. However, in the embodiment shown in FIG. 2, the cylinder has been extended almost to the top of the casting 16, with the thin film of material 19 covering the top of the cylinder 15 to lend the necessary integrity to the structure of the rule.

Figure 4:
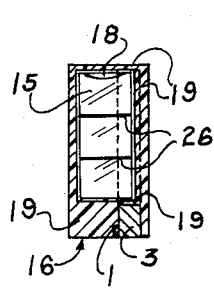
FIG. 4 is a sectional view enlarged of the vertical level of FIG. 2, taken along the lines 4—4 of FIG. 2 in the direction of the arrows.
Figure 5:
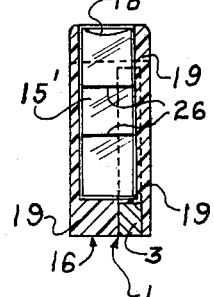
FIG. 5 is a sectional view enlarged of the vertical level of FIG. 3, taken along the lines 5—5 of FIG. 3 in the direction of the arrows.
Figure 6:
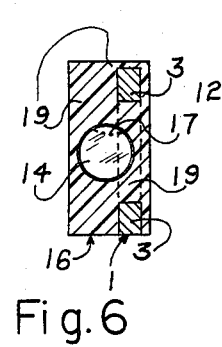
FIG. 6 is a sectional view enlarged of the horizontal level of FIG. 2, taken along the lines 6—6 of FIG. 2 in the direction of the arrows.

In the embodiment shown in FIG. 5, or in the one shown in FIG. 4, by the use of level cylinders of larger diameter, with a respective larger aperture 13 accommodation could be made for the particular amount of liquid in the level cylinder to provide a bubble of accurate size whereby a circular bubble marking line might be used in the top of the level cylinders 15 and 15' to enable reading from the top of the rule for omni-directional use. Conversely, it is anticipated that the aperture 13 for cylinder 15 could be disposed transversely entirely within the lateral edges of the rule, with a smaller cylinder for strength of structure.

Referring more particularly to FIG. 7, a better idea can be obtained as to the manner and particular use for this type of thin rule embodying a system of levels. The worker's hand 20 is holding a folding rule 1 of the type having a leaf section 2 and a leaf section 3, as indicated. The numeral markings might indicate a rule of an entirely different length.

The leaf section 3 is provided with the encapsulating casting 16 embodying the present invention.

It may be assumed that the worker is installing a switch box 21 having a low shelf 22 and side walls 24 defining a limited opening space 27.

Although this is only a partial view, it may be assumed that switch plates 23 cover switches which must be located very low in the opening and near the shelf 22. The switches may be of a gravity or mercury type. And it is important that the box 21 be mounted level.

Now it can readily be seen that here is presented a situation in which the side walls 24 might well be off of the true vertical angle and the level for gravity pull should be measured by some horizontal reference. The level of the limited shelf space 22 is the best indication of the level of the switch box.

Under such circumstances, a normal level system such as disclosed in the prior art, as well as most carpenters' levels, is too large to be employed in the limited space. However, with the folding rule 1 extended and bent at an angle as indicated in FIG. 7, the end of the rule leaf section 3 can easily be inserted into the limited space with a sufficient view of the level cylinder 14 to allow the level reading of the bubble 17. At the same time, the rule could be turned upon its side which has the thin thickness of the transparent material 19 and two types of level readings obtained by the worker, by means of a view from above, wherein the bubble of level cylinder 14 as well as the bubble of level cylinder 15 may be read to give two-directional leveling.

This type of level system for a thin rule allows the location of the levels for the most part within the body of the rule, but the projecting part is protected on the "up" side by the unitary encapsulating casting of moldable hardened transparent material. It will be seen that a sufficient small thickness of this material is provided on what could be considered the "down" side of the level, both to protect the levels and to give integrity to the rule structure which may have been weakened by the apertures retaining the levels.

It has been demonstrated that most of the prior art is directed toward the positioning of levels within the thickness alone of a much wider rule or in a special casing which would not be adaptable to a thin rule. In most instances it can be seen that the prior art would teach that a very small, uneasily read level would have to be used in a small thin rule. We have overcome that difficulty.

It can also be seen that the type of level system which we have disclosed here could be applied to a thin rule situation such as one might find in a carpenter's square. This would particularly be true of where one end of the square comprises a very thin rule which might be inserted into a small space.

While we have used in the illustrated embodiment of the invention a cold molding acrylic casting resin, such as one which is known by the trade name "Inmar", which may be provided in either a mix powder or liquid form; any suitable cold molding hardening plastic material may be used which will flow to encapsulate the levels through the apertures, as well as mold a sufficient thickness of material over the top of the rule edge and on the back side of thickness equal to the normal space between the folded leaves of the rule.

The positioning of the levels is no problem, since hardened plugs of the base casting material can always be used for this purpose. The placement of the mold, with the rule positioned therein, could easily be accomplished such that the desired thickness of the cast material could flow above the top of the leaf of the rule, as indicated in the drawings, and on the "down" backside or inside of the leaf of a rule of the type illustrated.

As has been stated, the sizing of this structure on a folding rule can be so accomplished that the rule may easily fit into a pouch or pocket as in the normal manner with the use of a normal rule without the leveling device.

Thus it will be seen that there has been provided an entirely different type of a unitary level system particularly adapted for a thin rule, and which is most suitably adapted to meet all of the objects and features hereinbefore set forth.

From the foregoing it will be seen that the invention is well adapted to attain all of the ends and objects, together with other advantages which are obvious and which are inherent to the structure.

It will be understood that certain features of any subcombinations of the invention are of utility and may be employed without reference to other features and sub-combinations. This is contemplated by and is within the scope of the claims.

As many possible embodiments of the invention may be made without departing from the scope thereof, it is to be understood that all matters set forth or shown in the drawings are to be interpreted as illustrative and not in a limiting sense.

Having thus described the invention, what is claimed is:

1. A level system for a thin rule comprising, in combination:
    a measured section of said rule, including manipulative front and back sides, having a lengthwise axially disposed aperture for a level extending through said section;

a transversely disposed aperture for a level extending through said section in juxtaposition to said lengthwise aperture;

a lengthwise level cylinder and a transverse level cylinder located respectively in said apertures, each said cylinder being so sized as to centrally dispose the same in its aperture in spaced relation to the sides of its opening;

an encapsulating casting of molded transparent material encompassing said rule section and apertures, enveloping said respective levels in their relative disposed positions;

said casting having a formed section on the front side of said rule section of thickness sufficient to cover said levels and of length sufficient to extensively cover said apertures and measured section of said rule;

said casting having a formed section on the back side of said rule coextensive with the front side thereof covering said apertures and levels with material of a less thickness than the front side configurated to lie in flat occlusive contact with an adjacent surface; and said cast further having for its extended length a formed section of rigid material along at least one edge of said rule adjacent to said apertures, said material of relatively small thickness sufficient to provide a structural reinforcement, independent and proportional relationship to the excised aperture rule material, at the linear surface of said edge coextendive and adjacent to each said aperture.

2. A level system for a thin rule as in claim 1, wherein said rule comprises:

an extendable folding rule, the measured section of said rule is the terminal leaf thereof, and the formed section of said casting on the backside thereof is of a thickness equal to the spacing between said terminal and next leaf when folded, configurated to allow said casting to lie in normal contact with the next leaf.

3. A level system for a thin rule as in claim 1, wherein said apertures for the respective levels comprise:

a lengthwise horizontal axially disposed rectangular opening extending through both sides of said rule in spaced relation to the lateral edges of said rule; and a transversely disposed rectangular opening extending through both sides of said rule recessed into one edge and in spaced relation to the opposite edge of the rule and in juxtaposition to said lengthwise opening.

4. A level system for a thin rule as in claim 1, wherein said level cylinders, respectively, comprise:

a horizontal level cylinder centrally disposed lengthwise in its aperture dimensioned substantially shorter in length than said aperture and of diameter substantially less than the width of said aperture but greater than the thickness of said rule and laterally projecting from the front side of said rule; and a transverse level cylinder centrally disposed in its aperture relative to the sides thereof dimensioned in length proximate to the length of said aperture but recessed in spaced relation from the lateral edge of said rule and the bottom of said aperture, and of diameter substantially less than the width of said aperture but greater than the thickness of said rule and laterally projecting from the front side of said rule.

5. A level system for a thin rule as in claim 1, wherein said level cylinders, respectively, comprise:

a horizontal level cylinder centrally disposed lengthwise in its aperture dimensioned substantially shorter in length than said aperture and of diameter substantially less than the width of said aperture but greater than the thickness of said rule and laterally projecting from the front side of said rule; and a transverse level cylinder centrally disposed in its aperture relative to the sides thereof dimensioned in length proximate to the length of said horizontal cylinder and projecting in spaced relation above the upper edge of said aperture and spaced from the bottom thereof, and said cylinder of diameter substantially less than the width of said aperture but greater than the thickness of said rule and laterally projecting from the front side of said rule.

6. A level system for a thin rule comprising, in combination with a folding extendable rule of parallel leaf sections pivotally connected to overlay adjacent sections in spaced relation thereto:

a measured section of a terminal leaf, including a manipulative front outside face and back inside face, having a lengthwise axially disposed level aperture extending through said section and faces;

a transversely disposed level aperture extending through said section and faces in juxtaposition to said lengthwise aperture;

a lengthwise level cylinder and a transverse level cylinder located respectively in the corresponding apertures, each said cylinder being so sized as to be seated centrally disposed therein spaced from the sides and ends of said apertures;

an encapsulating casting of molded transparent material encompassing said rule section and levels in seated position with said material interspersed through said apertures in the interspaces between said levels and the aperture sides;

said casting having a formed section on the front outside face of said rule leaf of thickness sufficient to cover said levels and of length sufficient to extensively cover said apertures and measured section of said rule;

said casting having a formed section on the back inside face of said rule leaf coextensive with the front outside thereof covering said apertures and levels with material of a less thickness than the front side thereof configurated to lie when said rule is folded in normal plane in flat occlusive contact with the adjacent rule leaf face; and said casting further having for its extended length a disposed section of rigid material along the structurally weakened edge of said rule adjacent to said apertures of relatively small thickness sufficient to provide a structural reinforcement, in dependent and proportional relationship to the excised aperture rule material, at the linear surface of said edge coextensive and adjacent to each said aperture.

7. A level system for a thin rule of the character as in claim 6 wherein said apertures and respective levels comprise:

a lengthwise horizontal axially disposed rectangular opening extending through both sides of said rule in spaced relation to the lateral edges of said rule;

a transversely disposed rectangular opening extending through both sides of said rule recessed into one edge and in spaced relation to the opposite edge of the rule and in juxtaposition to said lengthwise opening;

a horizontal level cylinder centrally disposed lengthwise in its aperture dimensioned substantially shorter in length than said aperture and of diameter substantially less than the width of said aperture but greater than the thickness of said rule and laterally projecting from the front side of said rule; and a transverse level cylinder centrally disposed in its aperture relative to the sides thereof dimensioned in length proximate to the length of said aperture but recessed in spaced relation from the lateral edge of said rule and the bottom of said aperture, and of diameter substantially less than the width of said aperture but greater than the thickness of said rule and laterally projecting from the front side of said rule.

8. A level system for a thin rule of the character as in claim 6, wherein said apertures and respective levels comprise:

a lengthwise horizontal axially disposed rectangular opening extending through both sides of said rule in spaced relation to the lateral edges of said rule;

a transversely disposed rectangular opening extending through both sides of said rule recessed into one edge and in spaced relation to the opposite edge of the rule and in juxtaposition to said lengthwise opening;

a horizontal level cylinder centrally disposed lengthwise in its aperture dimensioned substantially shorter in length than said aperture and of diameter substantially less than the width of said aperture but greater than the thickness of said rule and laterally projecting from the front side of said rule; and a transverse level cylinder centrally disposed in its aperture relative to the sides thereof dimensioned in length proximate to the length of said horizontal cylinder, but recessed in spaced relation from the bottom of said aperture with the outer end thereof projecting beyond the lateral edge of said rule, and of diameter substantially less than the width of said aperture but greater than the thickness of said rule and laterally projecting from the front side of said rule.

9. A level system for a thin rule of the character as in claim 6, wherein said transverse level cylinder disposed in its aperture comprises:

an extended level cylinder, containing fluid and an air bubble with side level markings to define the position of said bubble in horizontal mode, said cylinder being of slightly enlarged diameter centrally disposed in its aperture projecting in an upward direction beyond the lateral edge of said rule enveloped on its sides, bottom and top by said casting, and having a circular bubble mark on its upper end visible to mark the centered air bubble in upright position for omni-directional leveling.

10. A level system for a thin rule of the character described in claim 6, wherein, said encapsulating casting of molded transparent material comprises:

a cold-pour plastic casting resin, molded in place around and enveloping said measured rule section, apertures and levels contained therein, with a free supportive flow of said plastic material in the interstices between the levels and sides of the apertures;

said material cast of a thickness on the front face of the rule covering the projection of said levels;

said material cast of a thickness on the back side of said rule equal to the normal space between the leaves of the rule; and said material cast on the lateral edge of said rule proximal to the transverse aperture of a thickness sufficient to cover the transverse cylinder and reinforce the rule structure abutting said apertures.

* * * * *